United States Patent [19]

Williford

[11] Patent Number: 4,724,542

[45] Date of Patent: Feb. 9, 1988

[54] AUTOMATIC REFERENCE ADAPTATION DURING DYNAMIC SIGNATURE VERIFICATION

[75] Inventor: John D. Williford, Hopewell Junction, N.Y.

[73] Assignee: International Business Machines Corporation, Armonk, N.Y.

[21] Appl. No.: 821,564

[22] Filed: Jan. 22, 1986

[51] Int. Cl.$^4$ ............................................. G06K 9/00
[52] U.S. Cl. ......................................... 382/3; 382/15
[58] Field of Search .................. 382/3, 30, 34, 50, 14, 382/15

[56] References Cited

FOREIGN PATENT DOCUMENTS

WO85/00009  7/1985  PCT Int'l Appl. ..................... 382/3

OTHER PUBLICATIONS

Chainer et al, "Algorithm for the Selection of Reference Signatures . . . ", *IBM Tech. Disclosure Bulletin*, vol. 27, No. 7A, Dec. 1984, p. 4033.
Chainer et al, "Signature Verification Ref. Generation Using Feedback", *IBM Tech. Disclosure Bulletin*, vol. 27, No. 7B, Dec. 1984, pp. 4582–4583.
IBM Technical Disclosure Bulletin, vol. 21, No. 1, Jun. 1978, Anthony et al.
Conference Proceedings of the 1977 International Conference on Crime Countermeasures, by P. de Bruyne.

*Primary Examiner*—Leo H. Boudreau
*Attorney, Agent, or Firm*—Douglas W. Cameron

[57] ABSTRACT

A signature verification method wherein sets of reference signatures are automatically adapted to changing writing styles of a signer of a signature. More specifically, a number of signatures in a set of reference signatures are automatically replaced during a current verification session with signatures from the current verification session. In addition, signatures which would ordinarily be rejected using conventional methods of verification are compared with these new reference signatures which are indicative of current signing characteristics and then possibly accepted as true and valid signatures.

8 Claims, 3 Drawing Figures

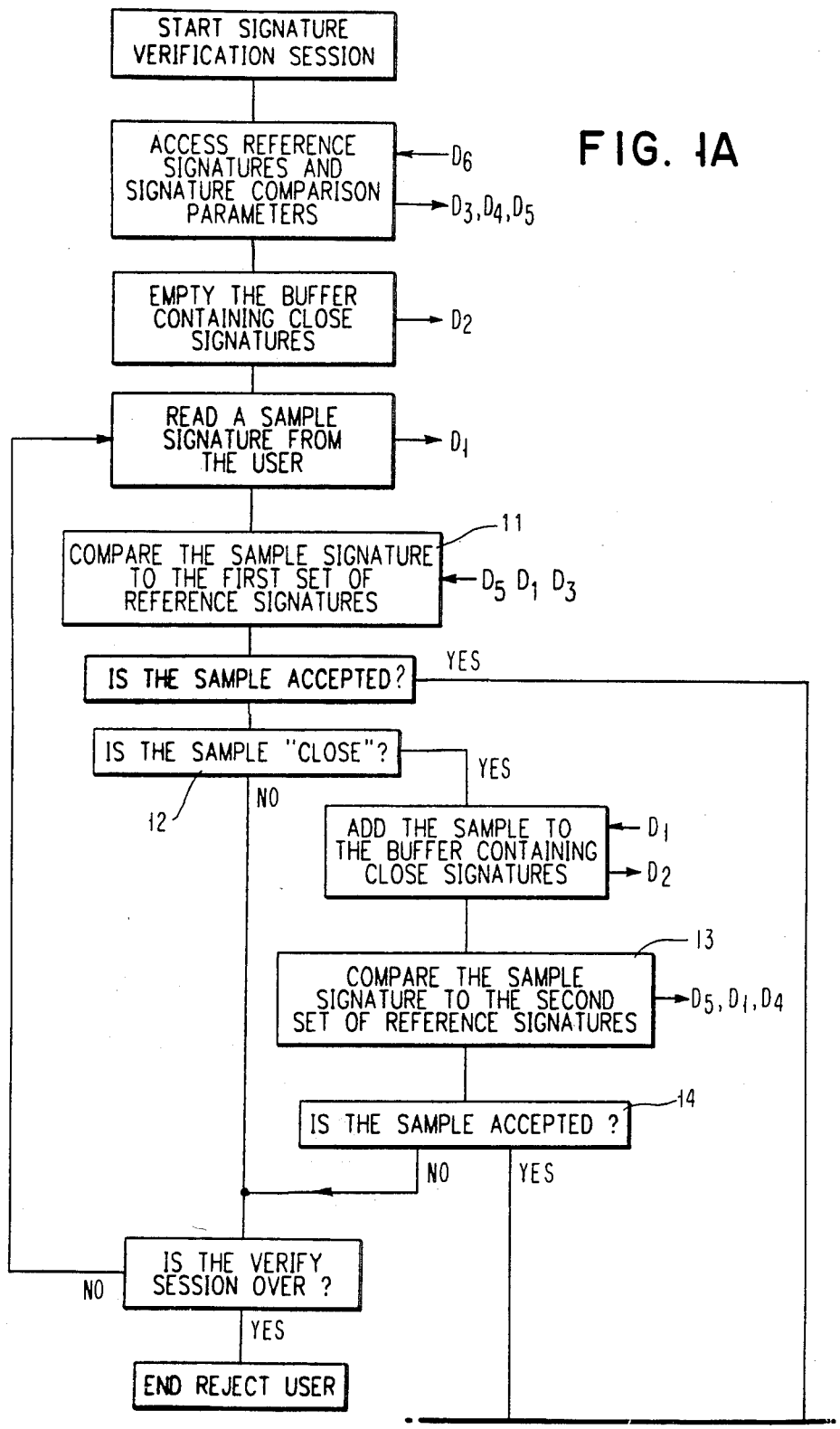

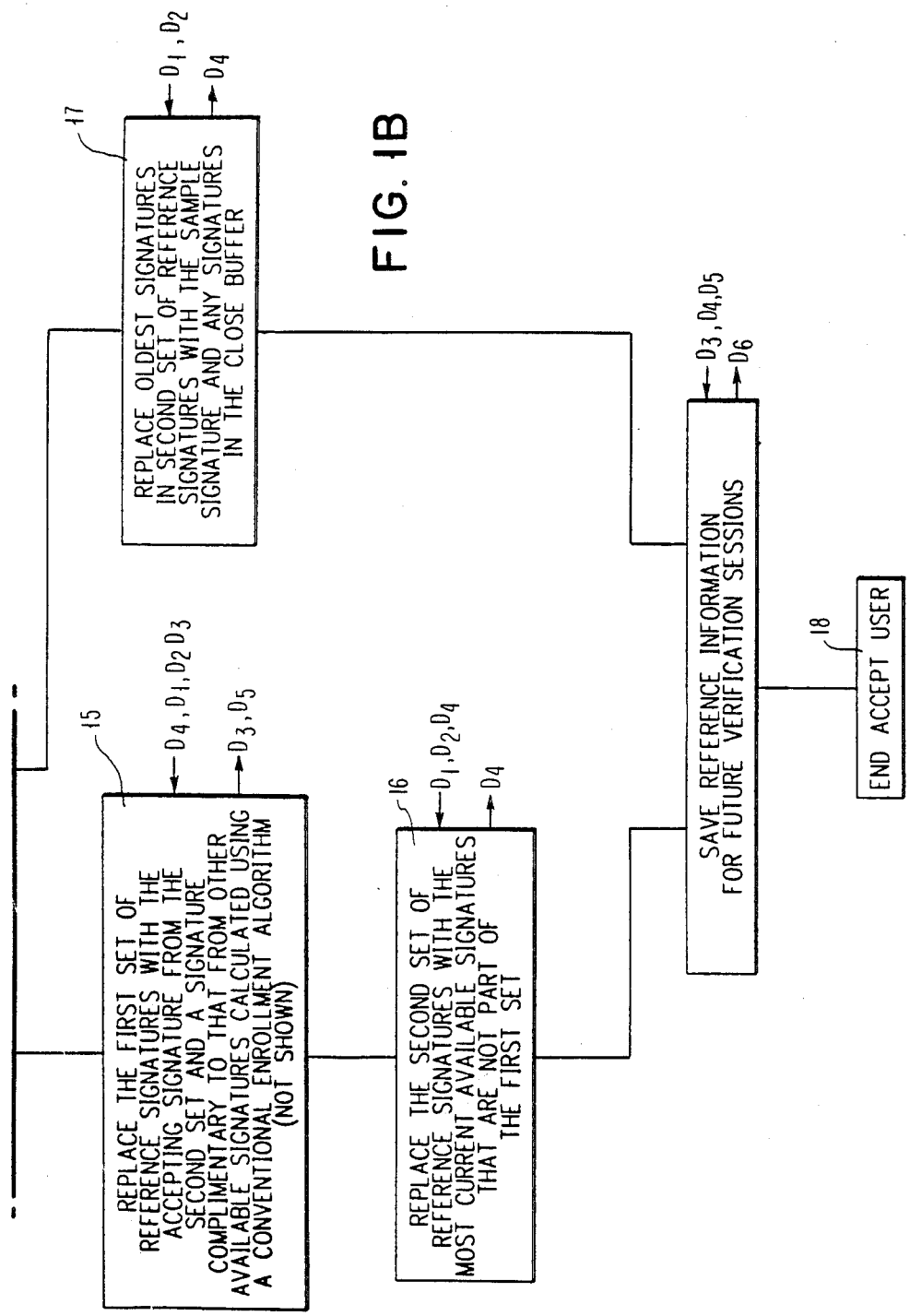

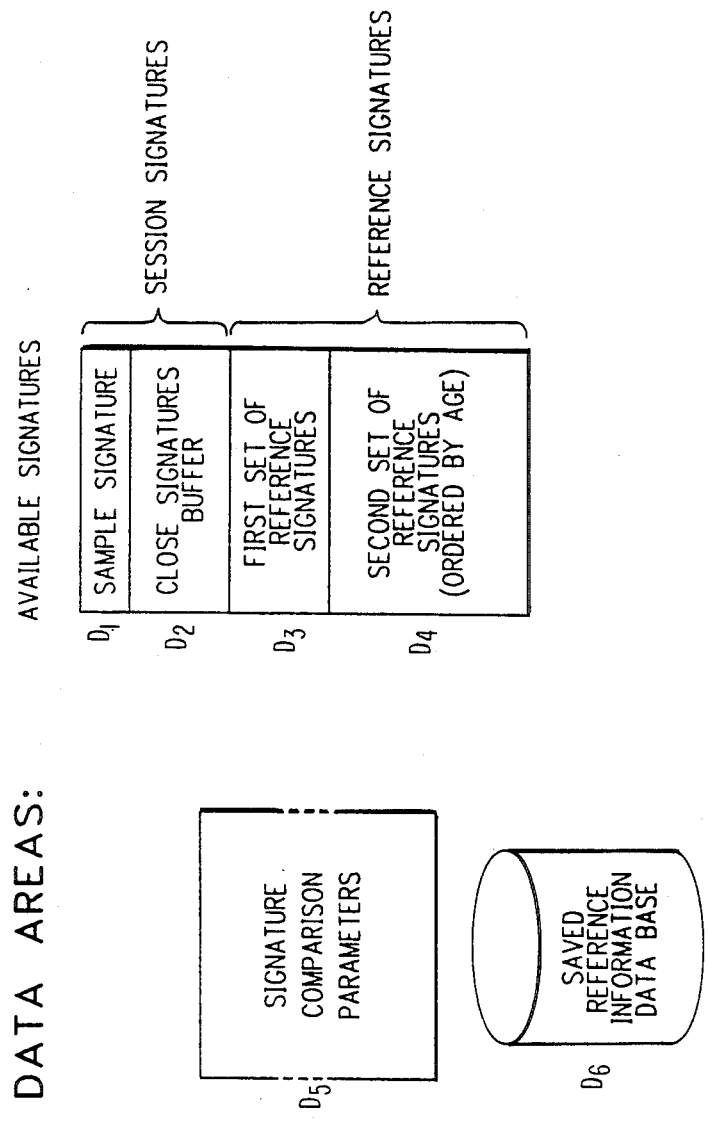

AUTOMATIC REFERENCE ADAPTATION DURING DYNAMIC SIGNATURE VERIFICATION

FIELD OF THE INVENTION

The present invention relates generally to the field of signature verification methods wherein sets of reference signatures are automatically adapted to changing writing styles of a signer of a signature. More specifically, a number of signatures in a set of reference signatures are automatically replaced during a current verification session with signatures from the current verification session without compromising the integrity of the verification system.

BACKGROUND OF THE INVENTION

There has always been a need in society for verifying a person's identity for a variety of purposes. Modern day scientific technology has adopted the widespread use of computers and related mechanisms for the purposes of giving credit, performing electronic funds transfer, and so forth. In all facets of the financial community including the retail industry, the securities industry, banking and the like, sums of money, securities and/or materials are transferred between owners based on the reliance of one person on the purported identity of another. Electronic systems including various cryptographic instruments together with secret identity numbers or keys provide a certain amount of security; however, the amount of security is predicated upon the degree of secrecy with which one is able to secure his own special identification key. Obviously, once a person's key is learned by another, presumably an unauthorized person, the other person may falsely assume his identity for a wide variety of electronic applications.

Identity verification by means of written signatures has long been known in the art, and helps to eliminate the possibility of an unauthorized person from learning information through which he can falsely assume another's identity. However, most known systems have various shortcomings. Simply matching the appearance of a recorded signature is not satisfactory as expert forgers can usually duplicate the appearance of a person's signature as well as the person himself. The result of this is that when an expert forger is involved, even expert document examiners are frequently unable to discover that the signature is forged.

Recent developments in the field of signature verification are exemplified by U.S. Pat. Nos. 3,983,535 and 4,128,829 of Herbst et al. These developments take advantage of the fact that the acceleration of and/or the pressure on a stylus or writing instrument can be predetermined and matched to an individual when he signs his name. The signature verification method of U.S. Pat. No. 3,983,535 is based on a single acceleration parameter, while the latter named patent is based upon two acceleration components and axial pen pressure.

The aforementioned developments, however, depend upon comparing a sample signature to be verified against an unchanging set of stored reference signatures. Thus, if an individual signer changes his writing style significantly, his signature will be rejected when compared with the reference signatures.

Further developments in the art of the reference generation process which modify the original reference based on later signatures is described in the literature by Chainer et al in the IBM Technical Disclosure Bulletin, Vol. 27, No. 7A, 12/84 p. 4033.

Another development which improves the reference by using feedback to modify the verification parameter is well known in the art and is described by Chainer et al in the IBM Technical Disclosure Bulletin, Vol. 27, No. 7B, 12/84, pp. 4582-4583.

Research experiments with dynamic signature verification methods identify two distinct population characteristics which cause an individual's writing style to change. First, a small percentage of the population has some difficulty in becoming acclimated to an electronic signature verification system. This effect is attributed to a technology-phobic reaction, for some, and, more predominantly, to an "immature signature" in others, that is, a signature which is inconsistent from one signing to the next. The latter is usually a result of those individuals having only rarely been required to sign their name so that they have yet to develop a ballistic signature. For whatever the reason, however, these few individuals may take between 1 and 2 weeks of daily signing to establish a consistent and repeatable signature. With a non-adaptive signature verification design, these individuals are required to re-enroll after they have established a consistent signature. They are not able to successfully use the signature verification system until that time. Secondly, almost all individuals slowly vary their signatures in time. For some, the migration from their signature at the time of enrollment is so slow that they can successfully use a signature verification system for the duration of tests we have conducted, typically 3 months. However, analysis shows that even these individuals degrade from their original performance in the system as the test progresses in time. A very extensive test would be required to determine the performance of a signature verification system over a long period of time and, as a result, long-term performance is difficult to predict in a non-adaptive system. Since there are enough individuals who demonstrate significant variations from their enrollment signatures during even a 3-month test, the variation phenomena is well demonstrated as a performance problem.

Historically, the solution to the performance problems attributed to these characteristics is to force those individuals who experience difficulty using a signature verification system to re-enroll in the signature verification system so that the system obtains current samples of the individuals' signing characteristics. However, this is an unacceptable solution for almost all of the applications for this technology. As an example, should the technology be incorporated within the retail industry, each individual having difficulty being electronically verified when trying to use a credit card or when trying to cash a check would have to be re-enrolled in the system. This implies a physical meeting between a system administrator, (e.g. a bank official) and the failing individual. This administration cost for the issuing establishment and for the consumer is unacceptable in this and most other applications. In addition, failing individuals are possibly publicly embarrassed which limits acceptance of such a technology in the consumer marketplace.

Another solution to this problem which was tried in the past was to manually adapt the set of reference signatures of failing individuals. In application, this requires a sales clerk or other transaction administrator to verify the individual's identity in some way other than signature verification, and then to employ an adaptation mechanism which would putatively be an electronic process which would exist at the point of transaction, thereby effectively re-enrolling that individual on the spot. In addition to being time consuming (for example, in a retail check-out line) and difficult to administrate, this solution fails in two respects. First, a sales clerk or other transaction administrator is required to maintain and frequently employ a secondary identity verification mechanism. Second, failure of the secondary mechanism to detect a forger would immediately compromise the signature verification system in that the forger would directly usurp the individual's reference and thereby gain complete control of the transaction medium. Thus, the effectiveness (i.e., the accuracy) of the signature verification system is reduced to that of the secondary mechanism, thereby eliminating the usefulness of the signature verification technology.

Thus, there is a need for a signature verification method which can automatically keep abreast of a user's variations in signing characteristics during the initial phases of system use and throughout the continued use of the system. This method cannot compromise the level of forgery protection.

SUMMARY OF THE INVENTION

Accordingly, the present invention provides the means to satisfy the aforementioned needs by providing for automatic adaptation of the set of reference signatures to changing writing styles of a signer. This technique drastically reduces both the false rejection rate and the false acceptance rate of a signature verification system.

This method of automatic reference adaptation is accomplished by creating a second set of reference signatures that includes samples of signatures which are representative of the user's current signing characteristics. The original reference signatures are hereafter referred to as the first set of reference signatures. The additional signatures are hereafter referred to as the second set of reference signatures. The second set of reference signatures are updated with current samples during each accepted signature verification session.

A signature verification session is typically comprised of a user submitting one or more sample signatures which are compared to that user's reference set of signatures.

The user's identify is verified whenever any one of the submitted sample signatures is accepted as valid when compared to that user's reference set of signatures.

The criterion for a sample signature's admittance into the second set of references is that either the signature must be accepted, or it must be "close" (as defined below) and have been submitted in a verification session which contained an accepted signature. This technique insures that there is a high probability that the second set of reference signatures holds sample signatures from the correct individual (not from a forger), and that it only contains samples which represent minor variations from the first set of reference signatures (i.e. it does not include intermittent, unusual fluctuations). The second set of reference signatures is maintained such that newly admitted samples replace the oldest samples in it. These newer sample signatures shall herein be referred to as current sample signatures.

During a verification session, a sample signature is compared with the first set of reference signatures. If the sample signature is rejected when compared to the first set of reference signatures but is close (see below) to a signature in the first set, this initially rejected signature is compared to the second set of reference signatures. If the initially rejected signature would be accepted as a valid signature when compared to the second set of signatures, then the initially rejected signature is accepted as a true signature and reference signatures in the first and second sets are changed. A signature is said to be an "initially rejected signature" when it would otherwise be rejected when compared with only the first set of reference signatures, without automatic reference adaptation. The above comparison is made using conventional signature verification tests. An initially rejected signature is said to be close to the first set of reference signatures if the signature is not accepted by existing signature verification methods, but is found to exceed an emperically derived threshold which is somewhat lower than the threshold used to determine acceptance of the signature.

A conventional signature verification test used to compare signatures results in a metric that indicates the degree of similarity of the two signatures being compared. This metric is generally called a "score." We herein refer to a high score as being one which indicates a strong similarity between two signatures; a low score as being one which indicates little similarity.

DESCRIPTION OF PREFERRED EMBODIMENT

FIGS. 1A and 1B show an overall schematic of a flow diagram illustrating the dynamic signature verification method of this invention.

FIG. 2 shows the data areas which are affected and used in FIG. 1.

The symbols $D_1, D_2 \ldots D_6$ shown in FIGS. 1 and 2 represent data areas defined in FIG. 2. The symbols shown adjacent to the process blocks are used to show which data areas are affected or used in these blocks. The arrows pointing to the right represent affected data areas while the arrows pointing to the left represent used data areas. The term initially rejected signature refers to a signature that is rejected when compared with a set of reference signatures using conventional signature verification tests using such parameters as pressure and/or acceleration correlation measures such as those described in U.S. Pat. Nos. 4,128,829 and 3,983,535, which patents are herein incorporated by reference. Instead of rejecting the signature completely when the sample signature is rejected by conventional tests, the method of this invention provides for further testing and for changing of the reference signatures. The reference signatures are by convention in the referenced patents, two signatures which are representative of an individual's signature characteristics. However, in the preferred embodiment of this invention, the reference signatures are typically six signatures. Two of the signatures are in a first set of reference signatures which are tantamount to the conventional reference signatures, while four of the signatures are in a second set of reference signatures which are maintained to represent current signing characteristics. The sample signatures are the signatures of a signer who purports to be the above individual in a signature verification session.

After accessing a user's reference information and a sample signature from the user and finding the sample signature to be initially rejected by conventional methods, the first step (see 12) of the method of this invention is to check if the rejected signature is "close" to any signature in the first set of reference signatures. The term "close" is used to imply that the signature has been rejected when applied to the conventional verification test, but was not too "far" from being accepted. More specifically, "close" usually means that the sample signature did not yield a score which exceeded a minimum acceptance threshold when applied to a conventional signature verification test, but did yield a score which exceeded an established threshold somewhat lower than the minimum acceptance threshold. For example, in the signature comparison using acceleration correlation, the sample signature would become a rejected signature if the acceleration correlation threshold were not exceeded. However, if an established threshold below the correlation threshold is exceeded, the rejected signature is said to be "close" to the reference signatures. Note that, as is the conventional case in defining an acceleration correlation threshold for accepting a signature as a true and valid signature, the threshold for determining that a signature is "close" is empirically derived and may vary depending on the performance characteristics that the verification system is to have. The nearer the "close" threshold is to the "accept" threshold, the less often the system will adapt an individual causing the system to have less resistance to false rejections. On the other hand, the farther the "close" threshold is from the "accept" threshold, the more often the system will adapt an individual. In the latter case, the system has less resistance to falsely accepting a forger. Emperically determining an optimum "close" threshold is within the scope of one skilled in the art.

If the rejected signature is close (12) to any one signature in the first set of reference signatures, the rejected signature is compared to each signature in the second set of reference signatures (13). This latter comparison (13) would be made by using a conventional signature verification test referred to above.

If the signature would be accepted as valid (using a conventional signature verification test) when compared with at least one of the signatures in the second set of reference signatures (14), the rejected signature is accepted as a true signature (18) and the first and second sets of reference signatures are changed, i.e., signatures in these sets are replaced with other signatures.

While the rejected signature is finally accepted as a true signature, it was initially rejected by the conventional signature verification tests. It is this final acceptance after initial rejection which indicates that the writing style of the signer is changing. So, to accommodate this changing writing style, the first and second sets of reference signatures are changed (15) (16) to reflect this new writing style. If an initially rejected signature of a current verification session is accepted when compared with any one of the second set of signatures, the signature in the second set of reference signatures which yields the highest score when compared against the sample signature is placed in the first set of reference signatures. It is called the selected first reference signature. In the preferred embodiment, only one other signature is contained in the first set of reference signatures. It is chosen using a conventional signature verification enrollment technique which finds the signature that best compliments the signature in the first set of reference signatures from the set of signatures currently available to the system which are known to be representative of the signer. In the preferred embodiment, these are the current verification session sample signature, any previous sample signatures from the current session which were close, the second set of reference signatures, and the signatures originally in the first set of reference signatures.

In the preferred embodiments the method used to select the other signature in the first set of reference signatures is a slight modification of the technique developed in U.S. Pat. No. 4,128,829 for enrollment. The comparison scores of all pairs of signatures is calculated producing an NxN matrix. The technique is as follows:

1. For every combination of selecting a signature from the set of N and the selected first ref., determine the maximum of the two measures versus each other signature in the set. (In matrix terms, isolate the two rows that correspond to the selected signature and the selected first ref. For each column in these two rows, select the maximum of the two measures.)

2. Save the minimum of these maximum values for each pair.

3. Select the signature that produces the maximum of the saved minimum values as the second signature in the new first set of reference signatures.

During this calculation, any signature comparison parameters which are conventionally a part of the reference are commensurately updated, as if an enrollment of the user had occurred. An example of these conventional comparison parameters are described in U.S. Pat. No. 4,128,829 which has been incorporated herein by reference. Finally, the second set of reference signatures are also changed (16). This change involves replacement of the old signatures in the second set of reference signatures with the most recent signatures available to the system (described above), excluding those which are now in the first set of reference signatures.

In the description above, there's an underlying assumption that the first and second sets of reference signatures were already in existence. It will now be shown how these first and second sets are initially formed. The first and second sets of signatures are initialized with signatures from the enroll process. The enrollment process comprises the step of obtaining a set of sample signatures from a signer, creating a reference file and storing this file in a data base. In this embodiment, six signatures are collected from a signer who wishes to enroll. Two signatures are chosen for the first set of reference signatures, while the remaining four signatures are assigned to the second set of reference signatures.

Having thus described my invention, what I claim as new, and desire to secure by Letters Patent is:

1. A method of automatically adapting reference signatures without human intervention to changing writing styles of a signer in a signature verification system, comprising the steps of:
   (a) creating a second set of reference signatures which contain current sample signatures indicating current signing characteristics;
   (b) comparing a sample signature to each signature in a first set of reference signatures;
   (c) accepting the sample signature if it would be accepted as a valid signature when compared with any of the signatures in the first set of reference signatures;
   (d) comparing a sample signature in each signature in the second set of reference signature if the sample signature would not have been accepted as valid when compared with any of the signatures in the first set of reference signatures and which is close to one of the signatures in the first set of reference signatures, the sample signature being accepted as a valid signatures, if it is accepted when compared to any of the signatures in the second set of reference signatures;

(e) changing the reference signatures in the first and the second set of reference signatures, wherein the changing of the first set of reference signatures comprises the steps of:

(i) selecting a first reference signature from the second set of reference signatures, the selected signature being the signature which would cause the initially rejected signature to be accepted as a valid signature and which receives the highest score in the second set of reference signatures when the selected first reference signature is compared with the initially rejected signature;

(ii) selecting a second reference signature from the set of signatures currently available, the second reference signature being the signature which best compliments the selected first reference signature;

(iii) replacing the first set of reference signatures with the selected first and second reference signatures;

and wherein the changing of the second set of reference signatures comprises the step of:

replacing the second set of reference signatures after changing the first set of reference signatures with the most recent signatures from the set of signatures currently available, excluding any signature included in the changed first set of reference signatures.

2. A method of automatically adapting reference signatures without human intervention and signature comparison parameters to changing writing styles of a signer in a signature verification system, comprising the steps of:

(a) creating a second set of reference signatures which contain current sample signatures indicating current signing characteristics;

(b) comparing a sample signature to each signature in a first set of reference signatures;

(c) accepting the sample signature if it would be accepted as a valid signature when compared with any of the signatures in the first set of reference signatures;

(d) comparing a sample signature to each signature in the second set of reference signatures if the sample signature would not have been accepted as valid when compared with any of the signatures in the first set of reference signatures and which is close to one of the signatures in the first set of reference signatures, the sample signature being accepted as a valid signature if it is accepted when compared to any of the signatures in the second set of reference signatures.

(e) changing the reference signatures in the first and second set of reference signatures, wherein the changing of the first set of reference signatures comprises the steps of:

(i) selecting a first reference signature from the second set of reference signatures, the selected signature being the signature which would cause the initially rejected signature to be accepted as a valid signature and which receives the highest score in the second set of reference signatures when the selected first reference signature is compared with the initially rejected signature;

(ii) selecting a second reference signature from the set of signatures currently available, the second reference signature being the signature which best compliments the selected first reference signature;

(iii) replacing the first set of reference signatures with the selected first and second reference signatures;

and wherein the changing of the second set of reference signatures comprises the step of:

replacing the second set of reference signatures after changing the first set of reference signatures with the most recent signatures from the set of signatures currently available, excluding any signature included in the changed first set of reference signatures;

(f) changing the signature comparison parameter calculated as if all of the available signature had been submitted during a single enroll session.

3. A method of automatically adapting reference signatures without human intervention and signature comparison parameters to changing writing styles of a signer in a signature verification system, comprising the steps of:

(a) creating a second set of reference signatures which contain recent sample signatures indicating current signing characteristics and which second set is an extension of a first set of reference signatures wherein the first set of reference signatures comprises two reference signatures and the second sets of reference signatures comprises four reference signatures and wherein the oldest signatures in the second set of reference signatures are updated with accepted signatures and with signatures which are close and which are obtained during a signature verification session which session included an accepted signature;

(b) comparing a sample signature to each signature in a first set of reference signatures;

(c) accepting the sample signature if it would be accepted as a valid signature when compared with any of the signature in the first set of reference signatures;

(d) comparing a sample signature to each signature in the second set of reference signatures if the sample signature would not have been accepted as valid when compared with any of the signatures in the first set of reference signatures and which is close to one of the signatures in the first set of reference signatures, the sample signature being accepted as a valid signature if it is accepted when compared to any of the signatures in the second set of reference signatures;

(e) changing the reference signatures in the first and second set of reference signatures, wherein the changing of the first set of reference signatures comprises the steps of:

(i) selecting a first reference signature from the second set of reference signatures, the selecting signature being the signature which would cause the rejected signature to be accepted as a valid signature and which receives the highest score in the second set of reference signatures when the selected first reference signature is compared with the rejected signature;

(ii) selecting a second reference signature from the set of signatures currently available, the second reference signature being the signature which best compliments the selected first reference signature;

(iii) replacing the first set of reference signatures with the selected first and second reference signatures;

and wherein the changing of the second set of reference signatures comprises the step of:

replacing the second set of reference signatures after changing the first set of reference signatures with the most recent signatures from the set of signatures currently available, excluding any signature included in the changed first set of reference signatures;

(f) changing the signature comparison parameters calculated as if all of the available signature had been submitted during a single enroll session.

4. A method of automatically adapting, without human intervention, reference signatures to changing writing styles of a signer in a signature verification system, comprising the steps of:

(a) creating a second set of reference signatures which contain current sample signatures indicating current signing characteristics;

(b) comparing a sample signature to each signature in a first set of reference signatures;

(c) accepting the sample signature if it would be accepted as a valid signature when compared with any of the signatures in the first set of reference signatures;

(d) comparing a sample signature to each signature in the second set of reference signatures if the sample signature would not have been accepted as valid when compared with any of the signatures in the first set of reference signatures and which is close to one of the signatures in the first set of reference signatures, the sample signature being accepted as a valid signature if it is accepted when compared to any of the signatures in the second set of reference signatures, (e) changing the reference signatures in the second set of reference signatures if the sample signature is accepted as valid when compared with signatures in the first set of reference signatures as in step (c), and changing the reference signatures in the first set of reference signatures if the sample signature is accepted as valid when compared with signatures in the second set of reference signatures as in step (d).

5. A method as recited in claim 4, wherein the oldest signatures in the second set of reference signatures are updated with accepted signatures and with signatures which are close and which are obtained during a signature verification session which session includes an accepted signature.

6. A method as recited in claim 4, wherein the reference signatures in both the first and second sets of reference signatures are changed, without human intervention, if an initially rejected signature is accepted as a valid signature.

7. A method as recited in claim 4, wherein the changing of the first set of reference signatures comprises the steps of:

(a) selecting a first reference signature from the second set of reference signatures, the selected signature being a signature which would cause the initially rejected signature to be accepted as a valid signature and which receives the highest score in the set of reference signatures when the selected first reference signature is compared with the initially rejected signature;

(b) selecting a second reference signature from the set of signatures currently available, the second reference signature being the signature which best compliments the selected first reference signature;

(c) replacing the first set of reference signatures with the selected first and second reference signatures.

8. A method as recited in claim 4, wherein the changing of the second set of reference signatures, comprises the step of:

replacing without human intervention the second set of reference signatures after changing the first set of reference signatures with the most recent signatures from the set of signatures currently available, excluding any signature in the changed first set of reference signatures.

* * * * *